Oct. 31, 1961 F. NICOLETTA 3,006,072
SHEAR BLADE THRUST ASSISTER
Filed March 17, 1959 2 Sheets-Sheet 1
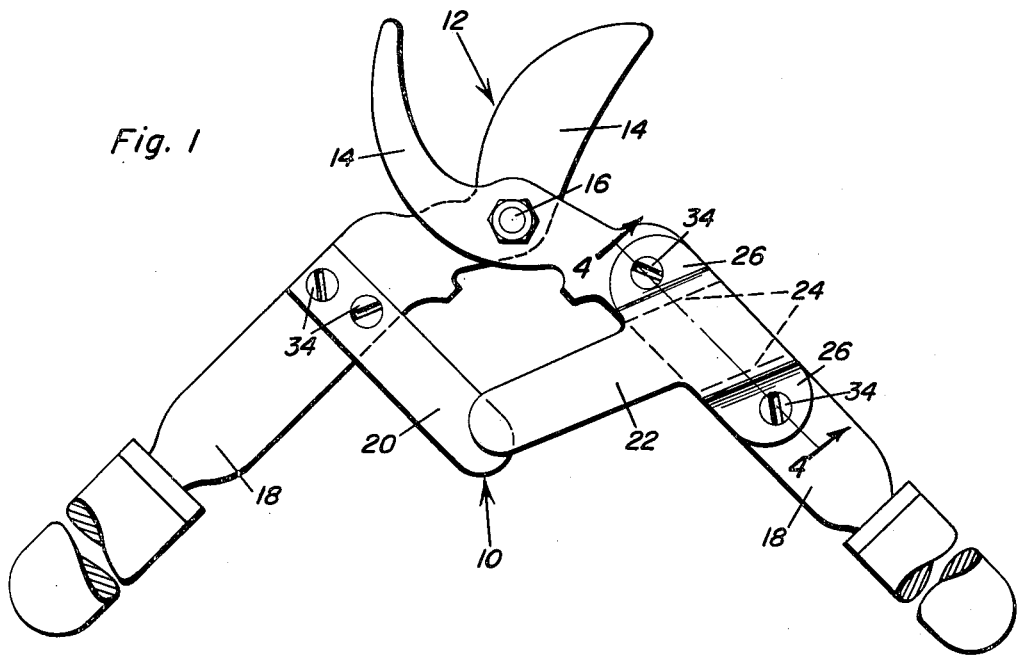
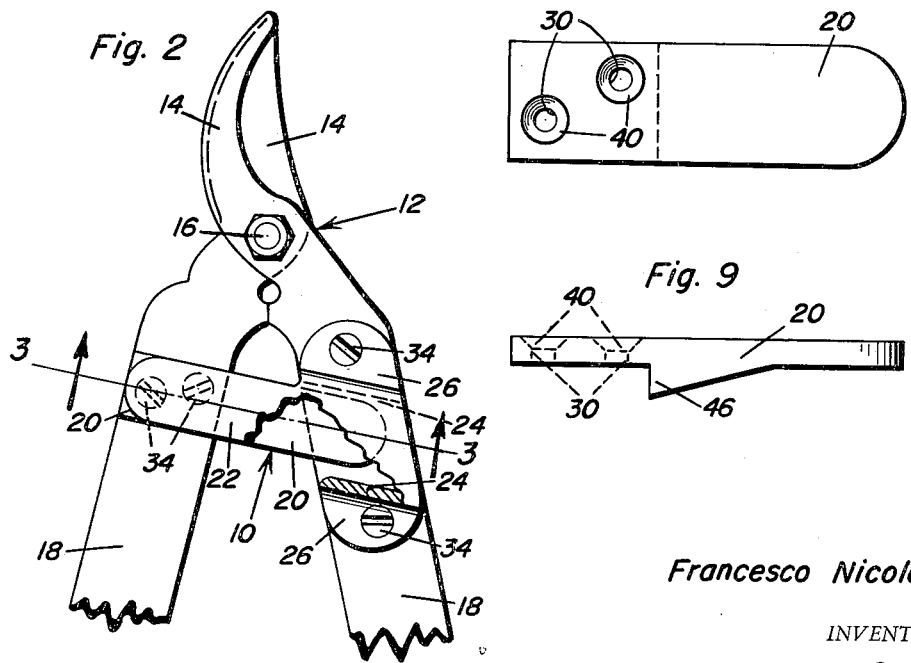
Francesco Nicoletta
INVENTOR.

Oct. 31, 1961    F. NICOLETTA    3,006,072
SHEAR BLADE THRUST ASSISTER
Filed March 17, 1959    2 Sheets-Sheet 2

Francesco Nicoletta
INVENTOR.

BY *Clarence A. O'Brien*
*and Harvey B. Jacobson*
Attorneys

United States Patent Office 3,006,072
Patented Oct. 31, 1961

3,006,072
SHEAR BLADE THRUST ASSISTER
Francesco Nicoletta, San Anselmo, Calif.
(115 Clayton St., San Rafael, Calif.)
Filed Mar. 17, 1959, Ser. No. 799,916
3 Claims. (Cl. 30—266)

This invention relates to a new and useful shear blade thrust assister which may be constructed either as an attachment for shears, or as an integral part thereof, being designed to keep the shear blades in constant cutting contact thereby affording maximum cutting efficiency at all times.

Many people using pruning shears have at one time or another tried to cut a limb or branch larger in diameter than that for which the shears were designed, with the result that the thrust applied to the shear blades caused them to spread apart so that the limb could not be cut with one cutting motion. In such an instance several cutting actions are necessary resulting in a cut which is not continuous or clean. It is a well known fact that this is not the preferred way to cut limbs or branches when pruning trees or shrubbery.

The main object of this invention is to provide a device which may be incorporated into the manufacture of pruning shears and the like, or be attached to existing shears. The thrust assister will eliminate substantially all possibility of the shear blades not being in cutting contact with each other at all times.

A further object of this invention is to provide a shear blade thrust assister which will itself be adjustable in order to compensate for wear in either the pruning shears or the thrust assister itself.

A still further object, in accordance with the preceding objects, is to provide a shear blade thrust assister which may be attached to existing shears in a manner which will not in any way interfere with the normal operation of the shears, and which will be of sturdy construction and lend itself to conventional forms of manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a plan view of a conventional form of pruning shears shown with the arms of the shear blade assister comprising the present invention secured to the handles of the pruning shears, with the blades of the shears shown in the open position;

FIGURE 2 is a plan view, like that of FIGURE 1, but with the shears shown in the closed position and the arms of the thrust assister in overlying relation, parts of one arm being broken away and shown in section revealing the other arm disposed therebeneath;

FIGURE 8 is an enlarged plan view of the left arm of the shear blade assister as seen in FIGURE 1; and FIGURE 9 is a side elevational view of the left arm of the shear blade assister as seen in FIGURE 8.

Figure 3:
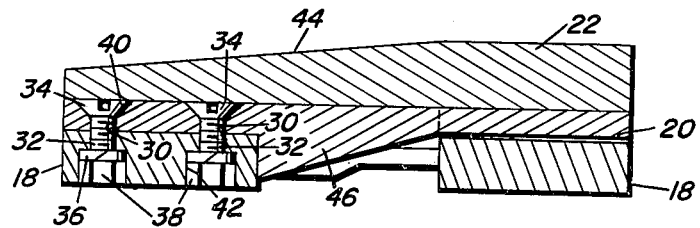
FIGURE 3 is a transverse vertical sectional view taken substantially upon the plane indicated by the section line 3—3 of FIGURE 2.
Figure 5:
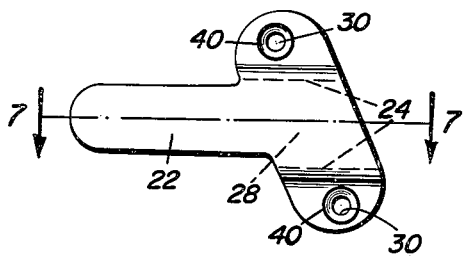
FIGURE 5 is a plan view of the right arm of the shear blade assister as seen in FIGURE 1.

Referring now more specifically to the drawings the numeral 10 generally designates the shear blade thrust assister comprising the present invention, see FIGURE 2, mounted upon a conventional form of pruning shears 12 having two blade elements 14, a pivot bolt 16 and two handle portions 18.

The shear blade thrust assister 10 comprises a first arm 20, attached in any convenient manner to one of the handle portions 18 and a second arm 22. First arm 20 is in the form of an elongated strap, having one end secured to one of the handles 18 of the shears 12, and extends laterally therefrom towards the other handle 18.

Second arm 22 is also in the form of an elongated strap having one end secured to handle 18 of the shears 12 with the other end projecting laterally therefrom toward the other handle 18, see FIGURE 1. Formed on the secured end of arm 22, at the side edges, are first flanges 24, see FIGURE 4, which extend at right angles therefrom terminating in outturned flanges 26 thereby providing a pocket 28 between the secured end of the second arm 22 and the corresponding handle 18. The second arm 22 is secured to handle 18 in any convenient manner by means of the second flanges 26.

As seen in FIGURE 1 of the drawings, even when the pruning shears 12 are in the open position, the confronting ends of the arms 20 and 22 are in overlying contacting relation. When the handle portions 18 are moved together to close the blade elements 14, arms 20 and 22 slide towards each other in overlapping relation as the pruning shears 12 are moved to the completely closed position, see FIGURE 2. The sliding contact between the arms 20 and 22 assures that the blade elements 14, due to an excess of thrust caused by a large or tough branch being cut therebetween, are not forced out of cutting contact with each other.

It will be further noted from a comparison of FIGURES 1 and 2 that as the blades close, the area of contact of the overlapping arms 20 and 22 progressively increases thereby proportionately increasing the reinforcing of the blades against lateral distortion as they progress in their cutting action.

As can thus be seen by FIGURE 2 of the drawings, the free end of the first arm 20 is received within the pocket 28 of the secured end of the second arm 22 as the blade elements 14 are moved to the closed position.

As shown in the drawings, see FIGURES 1 through 4, the preferred method of securing the arms 20 and 22 to their respective handle portions 18, is by forming a pair of bores 30 through each of the secured ends of arms 20 and 22 in alignment with apertures 32 formed in the corresponding handles 18, and by passing and securing through the aligned bores 30 and apertures 32 threaded machine screws 34 by means of lock washers 36 and nuts 38.

Figure 4:
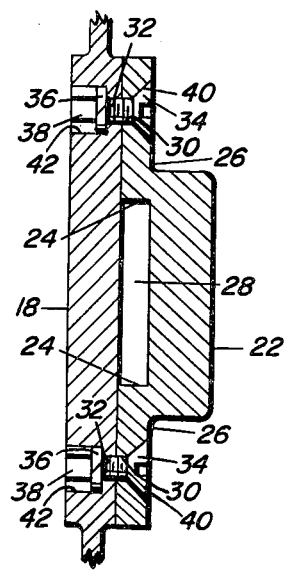
FIGURE 4 is a longitudinal vertical sectional view taken substantially upon the plane indicated by the section line 4—4 of FIGURE 1.

If desired, the remote ends of bores 30 and apertures 32 may be provided with beveled counterbores 40 and enlarged portions 42 respectively so as to receive countersunk screws 34 and the nuts 38 therefor in flush relation, see FIGURES 3 and 4.

Figure 6:
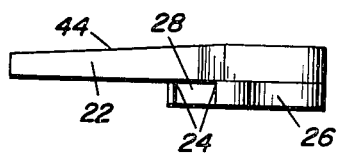
FIGURE 6 is a side elevational view of the right arm of the shear blade assister as seen in FIGURE 5.
Figure 7:
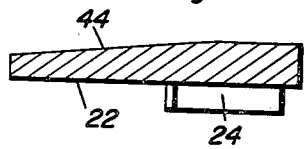
FIGURE 7 is a vertical longitudinal sectional view taken substantially upon the plane indicated by the section line 7—7 of FIGURE 5.

To enable the shears 12 to be used in more confined spaces, the surface of the free end of arm 22 which is remote from the free end of arm 20 is outwardly beveled as at 44, see FIGURES 3 and 6, so as to provide a reduced end portion which will be less likely to restrict the shears 12 from being used in confined areas. Further, to provide greater strength for arm 20, a bevel shoulder portion 46 is provided thereon which terminates in abutting relation to the inside edge of the handle 18 to which it is secured.

It is to be understood that both of the arms 20 and 22 are constructed of a rigid material which will allow them to overcome considerable thrust which may be placed upon the pivot bolt 16 while the shears 10 are being used to cut either branches which may be of greater diameter than for which the shears were intended, or smaller branches of extremely hard wood.

Further, it is to be understood that although not shown, shims may be provided for insertion between arm 20 and handle 18 to which it is secured to compensate for any wear of the contacting surfaces of arms 20 and 22.

Thus it can be seen that herein described is a device which will, while increasing the cutting power of pruning shears, also add to the length of time such shears may be used before being rendered ineffective because of excess amounts of thrust being placed upon the cutting blades thereof.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. For use with a pair of shears having a pair of pivotally connected shear blades each with a handle portion on the opposite side of the pivot, a thrust assister comprising a pair of generally flat, elongated arms each having one end secured to one of said handle portions with the free end thereof extending laterally therefrom towards the other arm, said arms being disposed in sliding contacting overlapping engagement and in the same relation to each other as are the corresponding blades, one of said arms having on its secured end a pair of parallel laterally extending and laterally offset flanges which are parallel to said last mentioned arm by which the latter is secured to the corresponding handle portion forming a pocket between said last mentioned arm and the corresponding handle portion which is adapted to receive the free end of the other arm when said blades are pivoted to the closed position.

2. The combination of claim 1 wherein both of said arms are secured to the same side of corresponding handle portions and the underlying arm is removably secured to its corresponding handle portion whereby a shim may be placed between the underlying arm and the handle portion to which it is secured to effect a greater pressure of one arm bearing against the other.

3. For use with a pair of shears having a pair of pivotally connected shear blades each with a handle portion on the opposite side of the pivot, a thrust assister comprising a pair of generally flat, elongated arms each having one end secured to one of said handle portions with the free end thereof extending laterally therefrom towards the other arm, said arms being disposed in sliding contacting overlapping engagement and in the same relation to each other as are the corresponding blades, one of said arms having on its secured end a pair of parallel laterally extending and laterally offset flanges which are parallel to said last mentioned arm by which the latter is secured to the corresponding handle portion forming a pocket between said last mentioned arm and the corresponding handle portion which is adapted to receive the free end of the other arm when said blades are pivoted to the closed position, and the other arm has a shoulder portion thereon engaging in abutting relation the inner surface of the handle portion to which it is secured.

References Cited in the file of this patent

UNITED STATES PATENTS

| | | |
|---|---|---|
| 903,370 | Frey | Nov. 10, 1908 |
| 2,348,903 | Hart | May 16, 1944 |